US006876176B2

United States Patent
Stefanovic et al.

(10) Patent No.: US 6,876,176 B2
(45) Date of Patent: Apr. 5, 2005

(54) TOROIDALLY WOUND INDUCTION MOTOR-GENERATOR WITH SELECTABLE NUMBER OF POLES AND VECTOR CONTROL

(75) Inventors: Victor R. Stefanovic, Afton, VA (US); John Michael Miller, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/728,889

(22) Filed: Dec. 2, 2000

(65) Prior Publication Data

US 2002/0093200 A1 Jul. 18, 2002

(51) Int. Cl.[7] .................. H02H 7/06; H02P 11/00; H02P 9/00
(52) U.S. Cl. ................................... 322/20
(58) Field of Search .................. 318/773, 254, 318/701; 340/166; 310/184; 322/20

(56) References Cited

U.S. PATENT DOCUMENTS

| | | | | |
|---|---|---|---|---|
| 3,794,870 A | * | 2/1974 | Broadway et al. | 310/180 |
| 4,127,787 A | * | 11/1978 | Auinger | 310/184 |
| 4,135,107 A | * | 1/1979 | Kamerbeek et al. | 310/179 |
| 4,260,923 A | * | 4/1981 | Rawcliffe | 310/184 |
| 4,284,919 A | * | 8/1981 | Auinger | 310/198 |
| 4,489,265 A | * | 12/1984 | Kuznetsov | 318/773 |
| 4,566,179 A | * | 1/1986 | Sawyer et al. | 29/596 |
| 4,672,251 A | * | 6/1987 | Broadway | 310/198 |
| 4,908,565 A | * | 3/1990 | Cook et al. | 322/10 |
| 5,350,988 A | * | 9/1994 | Le | 318/618 |
| 5,565,752 A | * | 10/1996 | Jansen et al. | 318/807 |
| 5,631,999 A | * | 5/1997 | Dinsmore | 388/805 |
| 5,739,664 A | * | 4/1998 | Deng et al. | 318/808 |
| 5,751,069 A | * | 5/1998 | Rajashekara et al. | 290/40 C |
| 5,754,026 A | * | 5/1998 | Hampo et al. | 318/713 |
| 5,798,632 A | * | 8/1998 | Muljadi | 322/29 |
| 5,903,128 A | * | 5/1999 | Sakakibara et al. | 318/721 |
| 5,929,612 A | * | 7/1999 | Eisenhaure et al. | 322/47 |
| 5,977,679 A | * | 11/1999 | Miller et al. | 310/164 |
| 5,994,881 A | * | 11/1999 | Miyazaki et al. | 322/16 |
| 6,008,616 A | * | 12/1999 | Nagayama et al. | 318/773 |
| 6,064,172 A | * | 5/2000 | Kuznetsov | 318/716 |
| 6,144,190 A | * | 11/2000 | Scott et al. | 322/25 |
| 6,239,582 B1 | * | 5/2001 | Buzan et al. | 322/20 |
| 6,396,161 B1 | * | 5/2002 | Crecelius et al. | 290/36 R |
| 6,456,033 B1 | * | 9/2002 | Nishimura | 318/773 |
| 6,633,151 B2 | * | 10/2003 | Johnson | 318/801 |

* cited by examiner

*Primary Examiner*—Darren Schuberg
*Assistant Examiner*—Julio C. Gonzalez
(74) *Attorney, Agent, or Firm*—Jennifer M. Stec; Smith Patent Office

(57) ABSTRACT

A system including an induction machine with a toroidally wound stator and a squirrel cage rotor is presented. The toroidally wound stator has a plurality of phase windings. A position sensor may be operatively connected to the induction machine for providing a position indication that is indicative of a relative position of the rotor and the stator. The system also includes an inverter having a plurality of solid-state switches and a control system. The inverter has the same number of phases as the toroidal induction machine. The inverter is connected to selectively energize the phase windings. A programmable microprocessor, such as a digital signal processor, is operatively connected to the induction machine and includes a program to implement vector control of the induction machine. The microprocessor can also control the inverter so that the induction machine operates with a predetermined number of poles using pole phase modulation.

11 Claims, 8 Drawing Sheets

Phase and coil connections for the 12-pole machine configuration

| Machine Pole | Coil Number | Machine Phases | | | | | |
|---|---|---|---|---|---|---|---|
| | | +A | +B | +C | -A | -B | -C |
| N | 1 | X | | | | | |
| N | 2 | | | | | X | |
| N | 3 | | | X | | | |
| S | 4 | | | | X | | |
| S | 5 | | X | | | | |
| S | 6 | | | | | | X |
| N | 7 | X | | | | | |
| N | 8 | | | | | X | |
| N | 9 | | | X | | | |
| S | 10 | | | | X | | |
| S | 11 | | X | | | | |
| S | 12 | | | | | | X |
| N | 13 | X | | | | | |
| N | 14 | | | | | X | |
| N | 15 | | | X | | | |
| S | 16 | | | | X | | |
| S | 17 | | X | | | | |
| S | 18 | | | | | | X |
| N | 19 | X | | | | | |
| N | 20 | | | | | X | |
| N | 21 | | | X | | | |
| S | 22 | | | | X | | |
| S | 23 | | X | | | | |
| S | 24 | | | | | | X |
| S | 25 | X | | | | | |
| S | 26 | | | | | X | |
| S | 27 | | | X | | | |
| N | 28 | | | | X | | |
| N | 29 | | X | | | | |
| N | 30 | | | | | | X |
| S | 31 | X | | | | | |
| S | 32 | | | | | X | |
| S | 33 | | | X | | | |
| N | 34 | | | | X | | |
| N | 35 | | X | | | | |
| N | 36 | | | | | | X |

Phase and coil connections for 4-pole machine configuration

| Machine Pole | Coil number | +A | +B | +C | +D | +E | +F | +G | +H | +I | -A | -B | -C | -D | -E | -F | -G | -H | -I |
|---|---|---|---|---|---|---|---|---|---|---|---|---|---|---|---|---|---|---|---|
| N | 1 | X | | | | | | | | | | | | | | | | | |
| N | 2 | | | | | | | | | | | | | | | X | | | |
| N | 3 | | X | | | | | | | | | | | | | | | | |
| N | 4 | | | | | | | | | | | | | | | | X | | |
| N | 5 | | | X | | | | | | | | | | | | | | | |
| N | 6 | | | | | | | | | | | | | | | | | X | |
| N | 7 | | | | X | | | | | | | | | | | | | | |
| N | 8 | | | | | | | | | | | | | | | | | | X |
| N | 9 | | | | | X | | | | | | | | | | | | | |
| S | 10 | | | | | | | | X | | | | | | | | | | |
| S | 11 | | | | | X | | | | | | | | | | | | | |
| S | 12 | | | | | | | | | | | | X | | | | | | |
| S | 13 | | | | | X | | | | | | | | | | | | | |
| S | 14 | | | | | | | | | | | | | | X | | | | |
| S | 15 | | | | | | X | | | | | | | | | | | | |
| S | 16 | | | | | | | | | | | | | X | | | | | |
| S | 17 | | | | | | | X | | | | | | | | | | | |
| S | 18 | | | | | | | | | | | | | | X | | | | |
| N | 19 | X | | | | | | | | | | | | | | | | | |
| N | 20 | | | | | | | | | | | | | | | | X | | |
| N | 21 | | X | | | | | | | | | | | | | | | | |
| N | 22 | | | | | | | | | | | | | | | | X | | |
| N | 23 | | | X | | | | | | | | | | | | | | | |
| N | 24 | | | | | | | | | | | | | | | | | X | |
| N | 25 | | | X | | | | | | | | | | | | | | | |
| N | 26 | | | | | | | | | | | | | | | | | | X |
| N | 27 | | | | X | | | | | | | | | | | | | | |
| N | 28 | | | | | | | | X | | | | | | | | | | |
| N | 29 | | | | X | | | | | | | | | | | | | | |
| N | 30 | | | | | | | | | | | | | X | | | | | |
| N | 31 | | | | | X | | | | | | | | | | | | | |
| N | 32 | | | | | | | | | | | | X | | | | | | |
| N | 33 | | | | | | X | | | | | | | | | | | | |
| N | 34 | | | | | | | | | | | | | X | | | | | |
| N | 35 | | | | | | | X | | | | | | | | | | | |
| N | 36 | | | | | | | | | | | | | | | | X | | |

TOROIDALLY WOUND INDUCTION MOTOR-GENERATOR WITH SELECTABLE NUMBER OF POLES AND VECTOR CONTROL

BACKGROUND OF THE INVENTION

1. Field of the Invention

The present invention relates to vector control of an induction machine with a selectable number of poles. The invention also relates to vector control of a multi-phase induction machine starter alternator having a selectable number of poles.

2. Discussion of the Related Art

Toroidally wound induction machines have been used for various applications. one of the methods for changing the number of machine poles without using any contactors or mechanical switches is called Pole-Phase Modulation (PPM).

The method of using PPM is only briefly discussed below. Basically, PPM is a method of changing the number of pole pairs of an AC machine winding without the need for contactors or mechanical switches. By its concept, mathematically, PPM is a generalized form of the Pole-Amplitude Modulation (PAM) method:

The number of phases with PAM is fixed, while with PPM it can vary.

PAM allows for pole change only in the ratio p:(p-1) while PPM provides for an arbitrary ratio.

The PPM implementation consists of selecting the number of pole pairs by controlling the phase shift between currents in the elementary phases, where each elementary phase consists of a coil or a group of coils connected in series. Since all conductors of the winding are energized at each pole pair combination, a machine with PPM has much better utilization of active material than a regular machine with separate windings for each pole pair.

As opposed to Dahlander's connection, which allows only one, 2:1, ratio between the number of pole pairs created by a single winding, the number of pole pairs in PPM is arbitrary. A PPM winding is a generalized Dahlander winding with an arbitrary number of two or more different pole pairs. The Dahlander winding is usually built with full pitch at lower speeds of rotation, and, therefore, with half the pole pitch, i.e. y+$\tau_p$/2 at higher speeds of rotation (y denotes here the winding pitch and $\tau_p$ is the pole pitch, both expressed in the number of slots). The PPM winding, on the other hand, is always built to have full pitch at higher speeds, when the number of pole pairs at lower speeds is odd, and a shortened pitch at higher speeds of rotation, when the number of pole pairs at lower speeds is even.

The number of pole pairs p is a function of the total number of stator slots N, the phase belt q, and the number of phases m according to the equation:

$$p = N/2qm \quad (1)$$

Where p and m must be obviously integers, and q is usually an integer. This means that an m-phase machine with N slots can be built having several pole pairs, the numbers of which depend on the value of q. Basically, the PPM method uses the inverter switches to re-connect machine coils in the desired pole-phase configuration. The principles of PPM will be illustrated using an example of two different numbers of pole pairs generated by a single winding. Since the winding configuration in PPM varies as a function of the number of pole pairs at lower speeds, the principles of PPM will be illustrated on a 72 slots, 4/12 pole toroidal machine. However, this example in no way restricts the generality of the PPM method.

By way of example, a toroidally wound induction machine having 72 slots on the stator is discussed. Each elementary coil uses one slot, and two adjacent elementary coils connected in series form a coil, so that the total number of coils is 36.

With the 12-pole connection, the machine has three coils per pole; the coils are configured in three phases, denoted A, B and C, so that each phase has 12 coils. The coil placement and direction of winding are shown in FIG. 1. The (+) or (−) sign associated with each phase, specifies whether the coil is wound in a positive or negative direction. For example, phase A consists of coils 1, 7, 13, 19, 25 and 31 wound in a positive direction and coils 4, 10, 16, 22, 28 and 34 wound in a negative direction and all connected in parallel. FIG. 2 shows the connections of all coils belonging to phase A for a 12-pole configuration. Superscript (') indicates the beginning of a coil; (") indicates the coil end. In the above schematic, coils #1, #7, #13, #19, #25 and #31 are positively wound coils while coils #4, #10, #16, #22, #28 and #34 are negatively wound coils. Note that one end of each coil is connected to the mid-point of each inverter branch, while the other is tied to the motor neutral. The inverter has a total of 72 switches.

With the high-speed configuration, the machine operates with 9 coils per pole. In this specific example, there are 9 phases, each having four coils (two wound in a positive and two in a negative direction). Coil placement and direction in which the coils are wound are given in FIG. 3. As before, the (+) or (−) sign associated with each phase, specifies whether the coils is wound in a positive or negative direction. For example, phase A consists of positively wound coils 1 and 19 and negatively wound coils 10 and 28. By comparing the coils having the same number (FIGS. 1 and 3) one can see that the direction in which each coil is wound does not change when machine number of poles is changed, meaning that pole changing is achieved only by appropriately connecting the fixed wound coils. (For example, coil #5 is always wound in a positive direction; coil #2 is always wound in a negative direction, etc.)

FIG. 4 shows connection of all coils belonging to phase A for this example of 4-pole connection. The change in pole numbers is achieved through inverter control—by selecting the sequence in which the coils are energized. The coils are re-arranged and re-assigned to appropriate phase through inverter control.

The above example, with the number of poles, number of phases and number of stator slots, is used only to illustrate the principle of Pole-Phase Modulation method. The pole changing is not restricted to configurations described above—for example, the 4-pole configuration can be also realized with a 3-phase winding. It is the combination of toroidally wound motor and inverter supply which gives the required flexibility of reconfiguring the machine winding by appropriately connecting the selected coils.

There are two basic methods for implementing vector control:

1. The indirect method, by which a specific, pre-calculated slip speed is imposed on the motor. As long as the correct slip speed is maintained (during both transients and in steady state), the drive operates with de-coupled (independent) control of motor output torque and rotor flux.

2. The direct method, by which a position of the rotor flux is either directly measured or is calculated from measurement of other motor variables. If such measurement does not include measurement of motor speed or position, the control is called "sensorless". While rotor flux is most commonly used, the airgap or stator flux can be also calculated or measured. The flux position is then used for a correct orientation of the drive control.

However these methods of vector control have never been used in connection with induction machines and Pole-Phase Modulation.

Toroidally wound induction machines with Pole Phase Modulation have been disclosed in U.S. Pat. No. 5,977,679. This disclosure is incorporated herein by reference.

SUMMARY OF THE INVENTION

An object of the present invention is to provide a configuration and a method for control of an induction machine operating in motoring and generating modes over a wide speed and torque range.

Another object of the present invention is to better match the high torque, low speed demand of engine cranking and the requirement for high efficiency, wide speed range of generator, using a combined alternator starter.

The objects of the present invention can be accomplished by combining the PPM method for pole changing with vector control. Using a toroidal machine facilitates PPM implementation and is also preferred for improved heat transfer.

The objects can also be accomplished by a motor system including an induction machine with a toroidally wound stator and a squirrel cage rotor. The toroidally wound stator has a plurality of phase windings. A position sensor is operatively connected to the induction machine for providing a position indication that is indicative of a relative position of the rotor and the stator. The motor system also includes an inverter having a plurality of solid-state switches and a control system. The inverter has the same number of phases as the toroidal induction machine. The inverter is connected to selectively energize the phase windings. A programmable microprocessor, such as a digital signal processor, is operatively connected to the induction machine and includes a program to implement vector control of the induction machine. The program controls the inverter so that the induction machine operates with a predetermined number of poles using pole phase modulation.

BRIEF DESCRIPTION OF THE DRAWINGS

The above and other objects and features of the present invention will be clearly understood from the following description with respect to a preferred embodiments thereof when considered in conjunction with the accompanying drawings, wherein the same reference numerals have been used to denote the same or similar parts or elements, and in which:

FIG. 1 is a table illustrating the phase and coil connections for a 12-pole machine configuration according to the present invention.

FIG. 3 is a table showing the phase and coil connections for a 4-pole machine configuration according to the present invention.

DETAILED DESCRIPTION OF THE PREFERRED EMBODIMENTS

Figure 2:
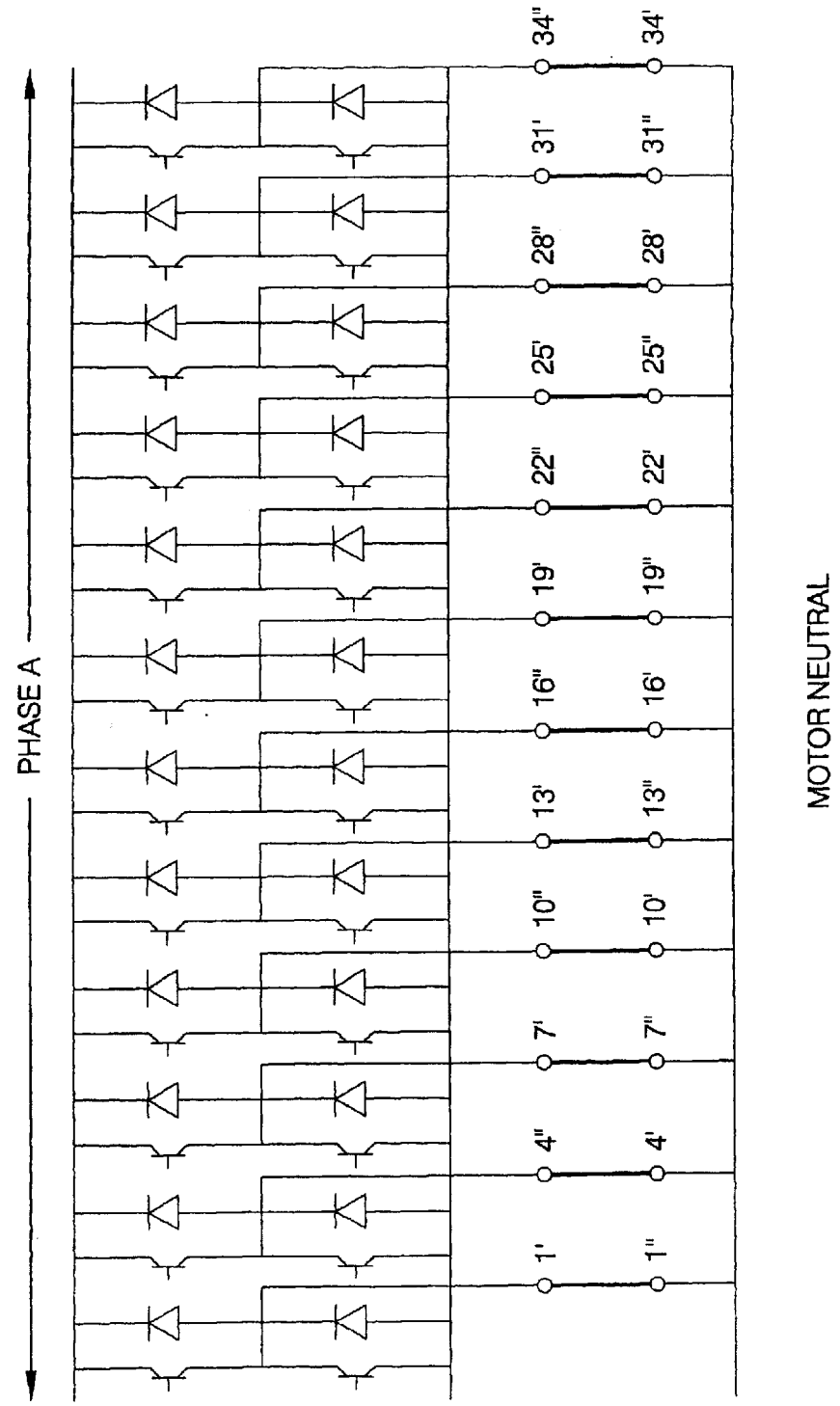
FIG. 2 is a schematic illustration of phase A connections for the 12-pole machine configuration according to the present invention.
Figure 4:
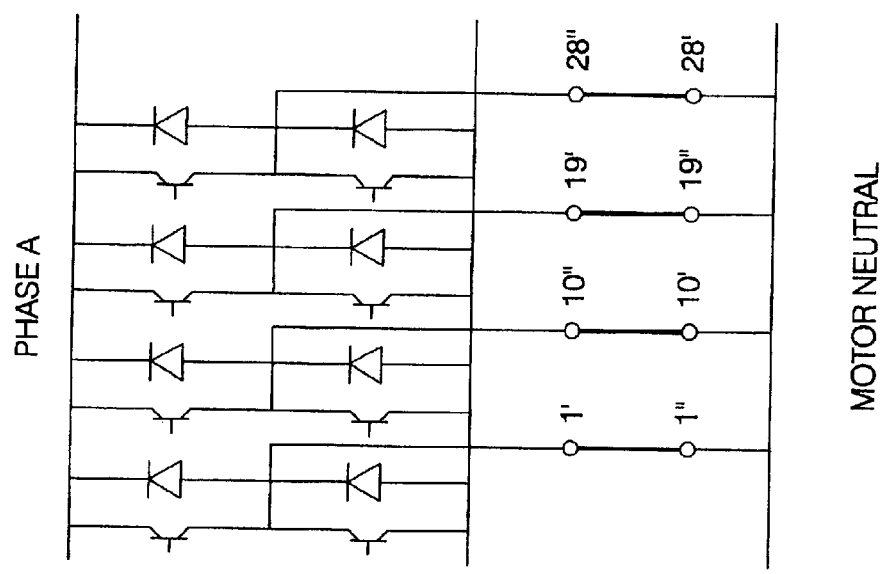
FIG. 4 is a schematic illustration of phase A connections for the 4-pole machine configuration according to the present invention.
Figure 5:
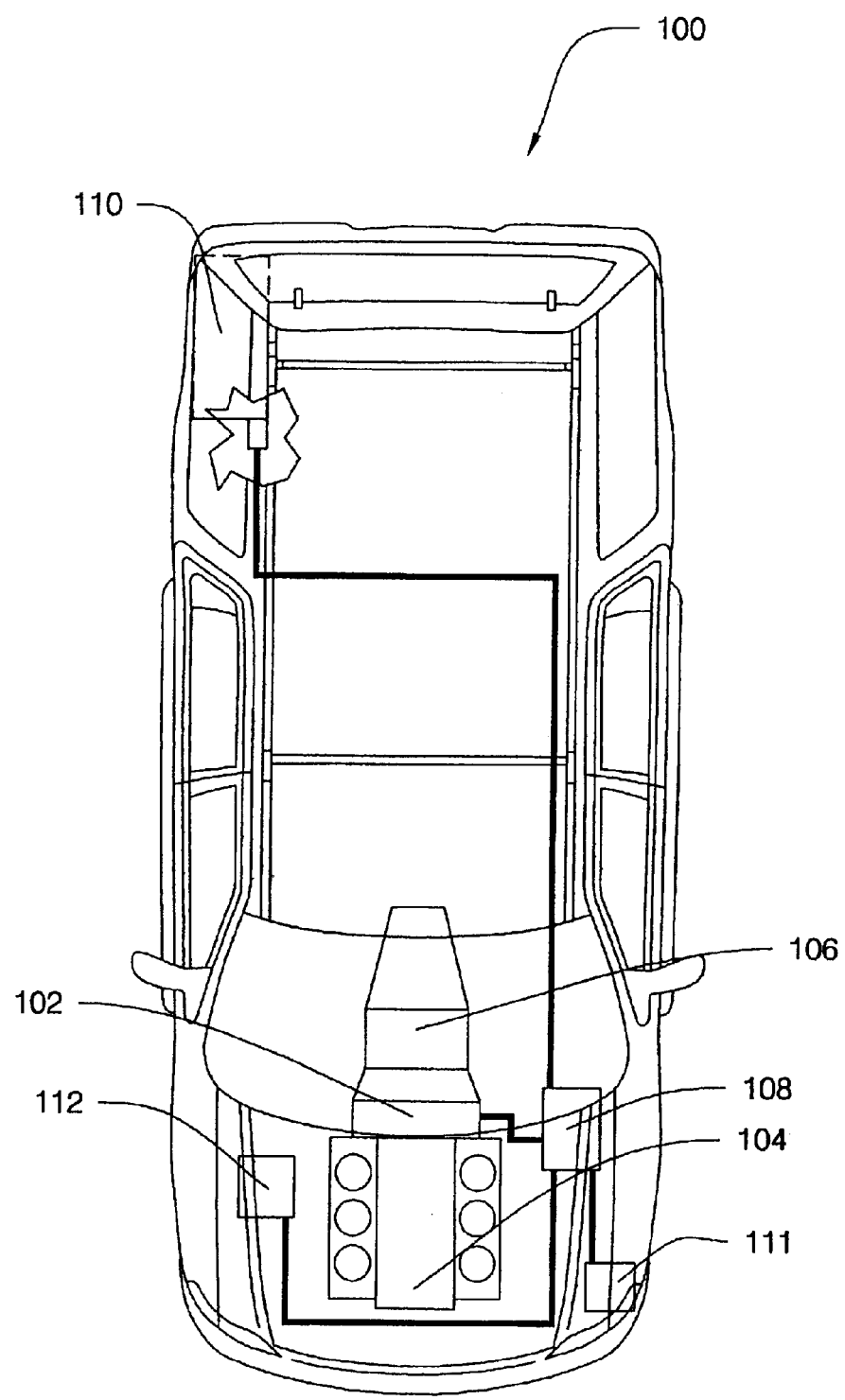
FIG. 5 is a perspective view of an automotive vehicle including an integrated starter alternator according to the present invention.

FIG. 5 shows an automotive vehicle 100 including an integrated starter alternator induction machine 102 connected between an engine 104 and a transmission 106. An integrated starter alternator controller 108 (also known as a SAM) is located in the vicinity of the starter alternator 102 to provide control thereto. The integrated starter alternator controller 108 is operatively connected to a 42V battery 110, 12V battery 111 and a vehicle system controller (VSC) and battery management controller (BMC) 112.

Vector control during the motoring operation will be discussed below. Motoring operation can be with either commanded speed or commanded torque as the input. The invention described here is applicable to both of these cases. Without loss of generality, implementation with commanded speed is now described. One of the possible implementations for controlling motor speed is presented schematically in FIG. 6.

The commanded speed ω* is compared with the measured speed ω$_r$. The speed error is processed through the speed regulator (Block 1), the output of which defines the torque command T*. This torque is converted into the commanded torque current component, iq* in Block 2. This current is compared with the measured torque producing component, iqfb. The current error becomes the input to the q-current regulator (Block 3), the output of which defines the q-component of the commanded motor voltage, Vq*

The commanded motor flux ψdr* is converted in Block 4 into the commanded flux component of the stator current, ids*. That current is compared with the measured flux current component idfb. The resulting current error is processed through the d-current regulator (Block 5), the output of which defines the d-component of the commanded motor voltage, Vd*. Note that in case of field weakening, the commanded flux level ψdr* is appropriately reduced.

The commanded slip speed, ωs is calculated in Block 6 according to:

$$\omega_s = \frac{R_2 L_m i_{qs}^*}{L_m \psi_{dr}}$$

So calculated slip speed is integrated and the obtained slip angle θs is added to the measured rotor position θr to obtain the position of the rotor flux, θ. The position of the rotor flux is then used to perform transformation between the stationary reference frame, in which the motor currents are measured and the synchronously rotating frame, in which the control is implemented. That transformation is done in Block 7. The flux position angle is also used to transform the calculated commanded motor voltages Vq* and Vd* from the synchronously rotating frame to the stationary frame (Block 8), where they become the commanded phase voltages VA, VB and Vc. The commanded phase voltages define the inverter PWM pattern and thus the motor input voltages. Finally, the measured rotor position, θr is appropriately differentiated to obtain the motor feedback speed, $\omega_r$. This signal is used to close the drive speed control loop.

When operating as a generator, the induction machine takes reactive power from the connected electric supply (such as a battery) and delivers active power to the load. A generator control can be implemented with several of the following variables as commanded inputs:

1. DC distribution (DC link) voltage. In this case, the generator control maintains the desired voltage at the inverter DC terminals, regardless of the generator speed or electric load. This is the most common control configuration.
2. Generator output current. In this case, the control maintains the output DC link current from the generator at the specified value. This configuration is sometimes used to control, for example, battery-charging current.
3. Generator speed. In this case, the generator is made to operate at a specified speed, regardless of the load and the prime mover. This configuration is sometimes used to optimize the efficiency of a wind turbine generating station.
4. Active power. In this case, the control regulates the power supplied by the generator to the desired level. This mode is a combination of the first two modes. Other variables are also possible to use as commanded inputs.

Figure 7:
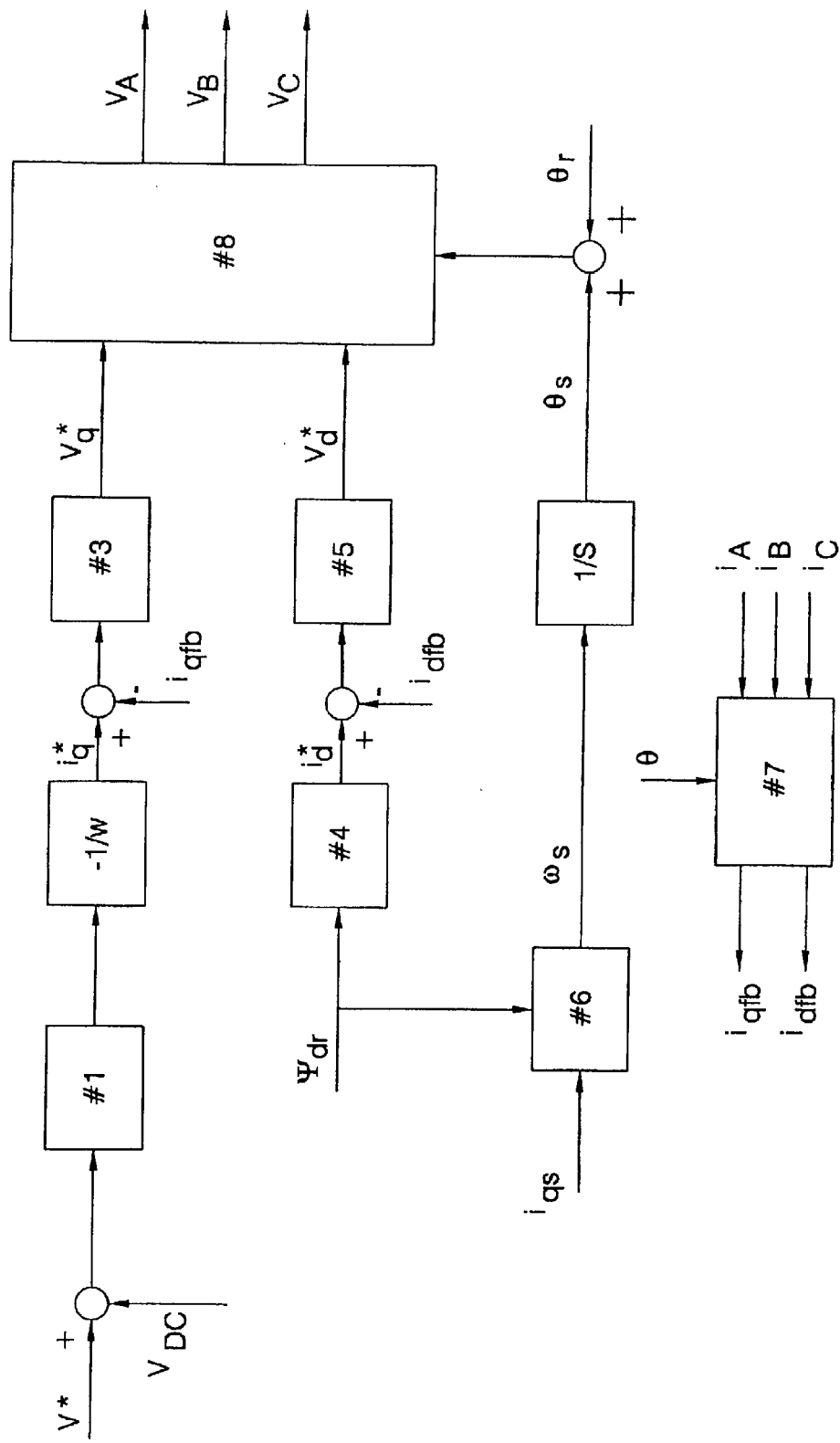
FIG. 7 is a schematic illustration of one possible way of implementing indirect field oriented control for generating application. The DC link voltage is the input command, which determines the generator resisting torque. The flux control, the slip speed calculation and the generation of the synchronous speed (angle θ) are the same as for motor control shown in FIG. 6 and the same designation of the control blocks applies.

As stated before, each of the configurations 1–4 can be implemented either by Direct or Indirect Vector Control. The generator control concept will be illustrated using Indirect Vector Control. Without loss of generality, a control, which maintains the DC voltage at a desired level, is now described. That control is schematically presented in FIG. 7.

Figure 6:
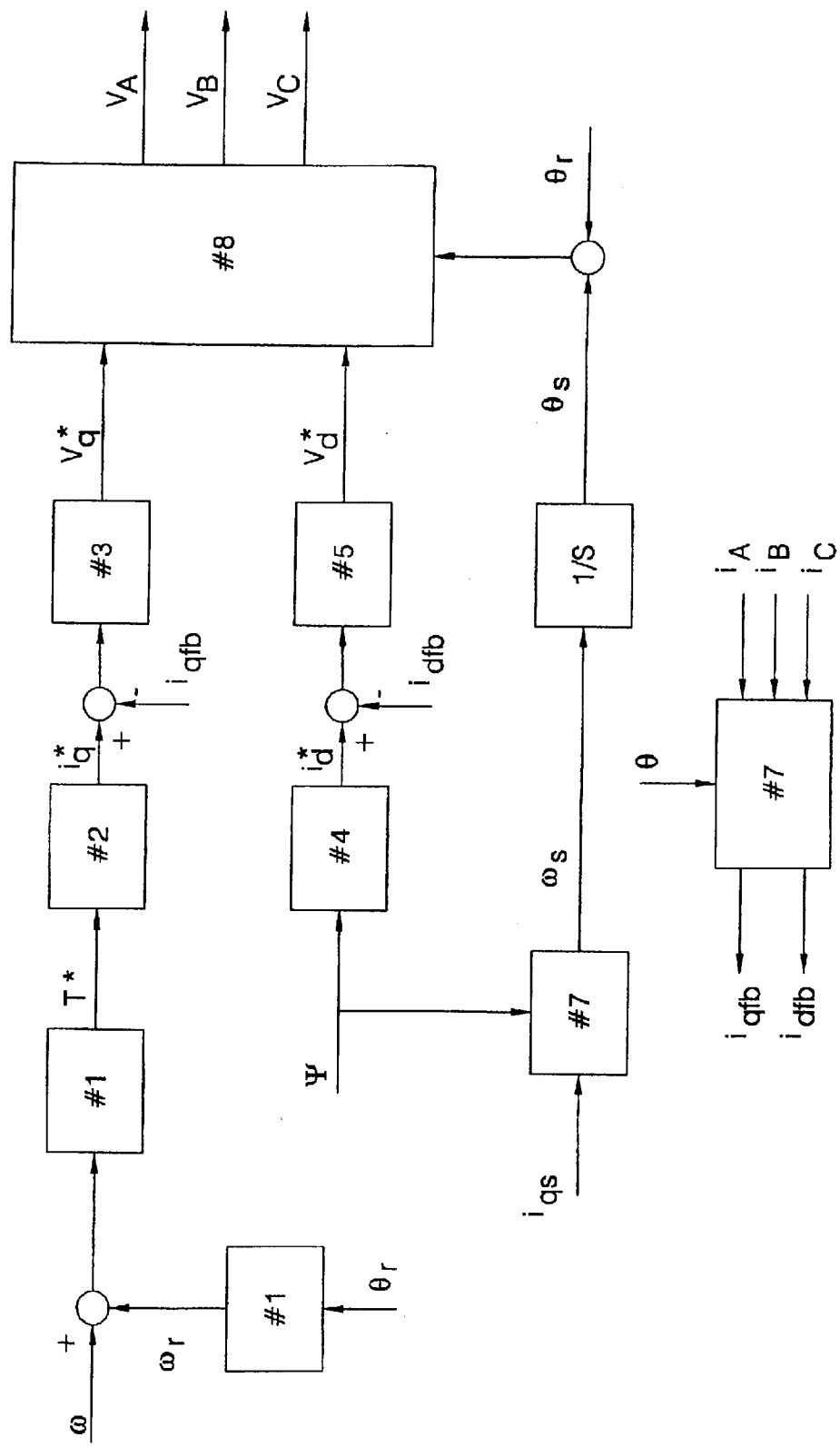
FIG. 6 is a schematic illustration of one possible way of implementing indirect field oriented control for motoring operation. Note the measurement of rotor position (angle θr) and calculation of the rotor flux position (angle θ).

The control is essentially very similar to the motor control of FIG. 6 and the same comments and control block designation made before apply here. The voltage control loop is analogous to the speed control loop in FIG. 6 as they both regulate the machine active power. The commanded voltage V* is compared with the measured DC voltage Vfb. The difference between these two voltages is processed through the voltage regulator (Block #1). The regulator output is divided by the stator frequency ω, to compensate the signal dependence on speed and is multiplied by (−1) to give the correct direction of the voltage control, that is, the generator commanded torque producing current component, iq*. That command signal is compared with the measured torque producing current iqfb. The difference is processed through the q-current regulator (Block #3), the output of which is the commanded q-voltage component, Vq*.

The input voltage command, V* determines the generator operating point, that is, the commanded current iq* and the generator resisting torque. For example, iq*=0 results in operation at synchronous speed. In fact, the control of iq* enables very smooth transitions between motoring and generating modes, while the machine field is maintained constant.

Figure 8:
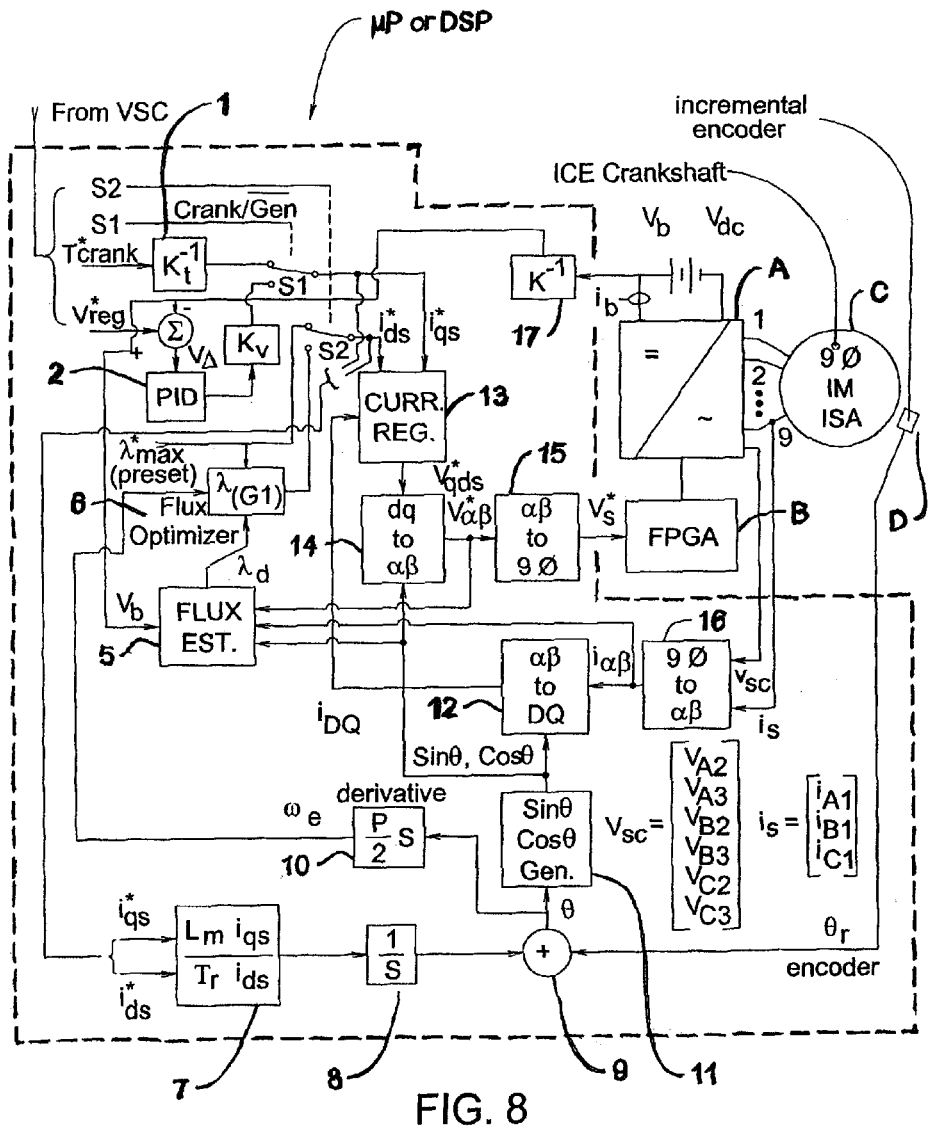
FIG. 8 is a schematic functional diagram for the integrated starter alternator according to one embodiment of the present invention.

In the functional diagram for the ISA as shown in FIG. 8, optimization functionality is added to the basic control (FIGS. 6 & 7) and a set of software switches S1 and S2 are devised to control the mode change over. S1 selects the source of command for $i^*_{qs}$ (motoring or voltage regulation) and, at the same time, the pole number S2 defines the flux level (maximum for motoring or adjustable, in case of a generator). The switch state is designated "1" in the upper and "0" in the lower position. Also, FIG. 8 shows motoring operation with commanded torque, $T_{crank}$ as opposed to speed control, FIGS. 6 and 7. For 3-phase, 12-pole (12p) operation (high torque, low-speed cranking) the switches are set S1=1, S2=1.

If prolonged cranking or vehicle launch assist (or even high-end boosting)is desired, then one sets S1=1 and S2=0 so that the flux program is engaged for field weakening at high speed. Inverter mode (12P, 3φ or 4P, 9φ) is selected by S1.

In the generator mode (S1=0 or default), torque mode is deselected and voltage regulated mode is engaged. Voltage set point, $V^*_{reg}$, is compared to battery, $V_b$, voltage. The output of the voltage regulator is amplified and scaled via $k_v$ to give a torque current command $i^*_{qs}$ as the input to synchronous frame current regulator where it is compared to feedback current $I_{DQ}$.

The output of the current regulator defines voltage command $V^*_{dqs}$ as described previously. That voltage command, in synchronous reference frame, is first transformed to 2-phase stationary (α-β frame), using flux position angle θ, and then, to 9-phase frame. (For motoring operation, the transformation is obviously to the 3-phase frame).

The flux optimization selects the best flux level for generator or high speed motor operation. (For low speed motor cranking, the maximum flux is selected).

The slip calculation and the synthesis of the flux position angle θ is accomplished in the same way as described earlier.

The blocks and functions implemented in a microprocessor (μP) or a DSP are shown within the dashed line of FIG. 8. Each of these blocks is further described below.

1. Block $K^1_t$ multiplies the commanded torque $T^*_{crank}$ by a well known formula to obtain the motor torque producing current $I^*_{qs}$.
2. PID block represents a proportional-integral-derivative voltage regulator, having as its input a voltage error (Difference between the commanded voltage, $V^*_{reg}$ and the actual, measured DC voltage, $V_{dc}$). The most general form the voltage regulator is shown.
3. $K_v$ block scales the output of the voltage PID controller and converts it to the commanded generator torque producing current $i^*_{qs}$.
4. Switches S1 and S2 are the software switches, which select the operating mode:
    S1 switch selects between the motor (upper position) and the generator (lower position) commanded torque producing current $i^*_{qs}$. The switch S1 also selects the number of machine poles (high number for motoring operation, upper position and lower number for generator operation, lower position).
    S2 selects between low speed flux command (upper position) and high speed generator or motor flux (lower position).
5. Flux estimator block calculates the machine actual flux from the commanded machine voltage $V^*_{\alpha\beta}$ and flux position (sin θ, cos θ) and the measured machine currents i and the DC voltage $V_b$.
6. Flux Optimizer block performs two functions:
    (a) It adjusts the commanded flux for high speed operation in function of the machine synchronous speed $\omega_o$
    (b) It regulates the machine flux level in high speed mode by comparing the adjusted commanded flux with the estimated flux and processing their difference through a PI flux regulator. The output from the regulator defines the commanded flux producing current, $I^*_{ds}$.

7. Slip calculation block computes the exact commanded slip speed $\omega^*_{slip}$ required by vector control:

$$\omega^*_{slip} = \frac{L_m}{T_r} \frac{i^*_{qs}}{i^*_{ds}}$$

where $T_r$ is the rotor time constant, $L_r/R_r$.

8. The slip speed is integrated in this block to obtain the "slip angle" $\theta_{slip}$ 9. This block ads the commanded slip angle $\theta_{slip}$ to the measured rotor position angle $\theta_r$ to obtain the angle $\theta$ which represents the position of the rotor flux.

10. The derivative block calculates the machine synchronous speed $\omega_c$ by differentiating rotor flux position, $\theta$.

11. The sine and cosine generator calculates these functions of the angle, for every position of the rotor flux.

12. This block transforms the measured currents from stationary ($\alpha$-$\beta$) to synchronously rotating (d-q) reference frame using sin $\theta$ and cos $\theta$ functions.

13. This block represents 2-channel current regulator, in the synchronous reference frame. It compares commanded $i^*_q$ and $i^*_d$ currents with the measured $i_d$ and $i_q$ currents and processes their respective differences through a PI regulator. The output of the current regulator represents the commanded voltages $V_{dq}$.

14. This block transforms the commanded voltages $V^*_{dq}$ from synchronous (d–q) to stationary ($\alpha$-$\beta$) reference frame.

15. This block transforms commanded voltages from 2-phase stationary to 9-phase stationary reference frame.

16. This block transforms measured currents from 9-phase stationary to 2-phase stationary reference frame.

17. This block ($K^{-1}$) scales the measured DC voltage to signal level, for control purposes.

The blocks that are outside of the microprocessor or the DSP are described as follows:

A. The power inverter, which converts the battery DC into AC power during motoring and the generator AC into DC power during generation. In this particular example, the inverter is shown with nine phases at the output.

B. FPGA (Field Programmable Gate Array) which is used to define the PWM pattern for control of the inverter switches. (The PWM pattern determines the "on" and "off" time for each of the inverter switches)

C. The Induction Machine, which is designed so that it can be controlled with a Pole-Phase Modulation method. In this particular example, the induction machine is shown with nine phases.

D. The position sensor, which measures the instantaneous rotor position $\theta_r$. In this example, the position sensor is shown to be an incremental encoder.

It should be emphasized that the examples given here, for pole-changing (PPM, FIGS. 1–4) and vector control (FIGS. 6–8) implementations are given for illustrations only and are in no way restrictive of the concepts claimed here. It should also be understood that the microprocessor as discussed above refers to any type of microprocessor including a DSP, a microprocessor disposed in a computer or other types of microprocessors that are well known in the art. Furthermore, it should be understood that the vector control described herein can be equally implemented using a sensorless method which is well known in the art.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A system comprising:
    an induction machine with a stator and a rotor, said stator having a plurality of phase windings;
    an inverter having a plurality of solid-state switches with appropriate controls and having the same number of phases as said induction machine, said inverter being connected to selectively energize said windings; and
    a programmable microprocessor operatively connected to said inverter and including a program for controlling said inverter that includes means for operating said induction machine using pole phase modulation to change the number of stator and rotor poles to a plurality of pole combinations; and
    wherein said program operates to switch control of said induction machine between a motoring operation mode and a generating operation mode, each of said operation modes operates said induction machine with a desired number of poles.

2. A system according to claim 1, wherein said stator is a toroidally wound stator.

3. A system according to claim 1, wherein said rotor is a squirrel cage rotor.

4. A system according to claim 1, wherein said stator is a toroidally wound stator and said rotor is a squirrel cage rotor.

5. A system according to claim 1, wherein said programmable microprocessor is a digital signal processor.

6. A system according to claim 1, wherein said microprocessor further includes means for controlling said inverter by vector control.

7. A system according to claim 1, further comprising a position sensor operatively connected to said induction machine for providing a position indication that is indicative of a relative position of said rotor and said stator.

8. A system comprising:
    an induction machine with a stator and a rotor, said stator having a plurality of phase windings;
    an inverter having a plurality of solid-state switches with appropriate controls and having the same number of phases as said induction machine, said inverter being connected to selectively energize said windings; and
    a programmable microprocessor operatively connected to said inverter and including a program for controlling said inverter that includes means for operating said induction machine using pole phase modulation to change the number of stator and rotor poles to a plurality of pole combinations; and
    wherein said program operates to control the induction machine as a generator, and wherein said program operates to switch control of said induction machine between a motoring operation mode and a generating operation mode, each of said operation modes operates said induction machine with a desired number of poles.

9. A system comprising:
    an induction machine with a stator and a rotor, said stator having a plurality of phase windings;
    a position sensor operatively connected to said induction machine for providing a position indication that is indicative of a relative position of said rotor and said stator;
    an inverter having a plurality of solid-state switches with appropriate controls and having the same number of phases as said induction machine, said inverter being connected to selectively energize said windings; and a programmable microprocessor operatively connected and including a program to implement vector control of said induction machine, said microprocessor includes means for controlling said inverter so that said induction machine operates with pole phase modulation to change the number of stator and rotor poles to a plurality of pole combinations; and wherein said program operates to switch control of said induction machine between a motoring operation mode and a generating operation mode, each of said operation modes operates said induction machine with a desired number of poles.

10. A system according to claim 9, wherein said stator is a toroidally wound stator and said rotor is a squirrel cage rotor.

11. An automotive propulsion system including a system comprising:

an induction machine with a toroidally wound stator and a squirrel cage rotor, said toroidally wound stator having a plurality of phase windings;

a position sensor operatively connected to said induction machine for providing a position indication that is indicative of a relative position of said rotor and said stator;

an inverter having a plurality of solid-state switches and a control system, said inverter having the same number of phases as said toroidal induction machine, said inverter being connected to selectively energize said windings; and a programmable digital signal processor operatively connected to said induction machine, said programmable digital signal processor including a program to implement vector control of said induction machine, said programmable digital signal processor includes means for controlling said inverter so that said induction machine operates with a predetermined number of poles using pole phase modulation to change the number of stator and rotor poles to a plurality of pole combinations.

* * * * *